US006748873B2

(12) United States Patent
Brown, Sr.

(10) Patent No.: US 6,748,873 B2
(45) Date of Patent: Jun. 15, 2004

(54) MULTI-CONFIGURABLE PORTABLE DESK COMPANION

(76) Inventor: Dolhman Brown, Sr., 1309 Dupas St., Gretna, LA (US) 70053

( * ) Notice: Subject to any disclaimer, the term of this patent is extended or adjusted under 35 U.S.C. 154(b) by 123 days.

(21) Appl. No.: 10/008,010

(22) Filed: Nov. 13, 2001

(65) Prior Publication Data

US 2002/0066630 A1 Jun. 6, 2002

Related U.S. Application Data

(60) Provisional application No. 60/252,075, filed on Nov. 21, 2000.

(51) Int. Cl.$^7$ ................................................ A47F 5/12
(52) U.S. Cl. ........................ 108/6; 248/161; 108/49
(58) Field of Search ............................... 108/6, 4, 8, 9, 108/10, 115, 49; 248/458, 403, 136, 131, 150, 158, 161, 166, 434

(56) References Cited

U.S. PATENT DOCUMENTS

| 70,339 A | * | 10/1867 | Kretitz |
| 357,074 A | * | 2/1887 | Fee |
| 893,694 A | | 7/1908 | Allenson |
| 1,898,666 A | * | 2/1933 | Isaacson |
| 3,113,531 A | * | 12/1963 | Barnard |
| 3,177,991 A | | 4/1965 | Walker |
| 3,669,227 A | | 6/1972 | Alford |
| 4,058,066 A | * | 11/1977 | Altman |
| 4,595,086 A | | 6/1986 | Simpson |

FOREIGN PATENT DOCUMENTS

| EP | 553418 | * | 11/1992 |
| GB | 2112279 | * | 7/1983 |

* cited by examiner

Primary Examiner—Jose V. Chen
(74) Attorney, Agent, or Firm—Lisa D. Velez

(57) ABSTRACT

A multi-configurable portable desk or table companion that is adjustable to permit it to be folded for transport and configured to one of a desk state, podium state, easel state, music stand or artist table state. The desk companion can be used also to support a laptop. The multi-configurable portable desk companion includes two arm members angularly adjustable via a lever-operated adjustment clamp and a multi-positionable desktop surface angularly adjusted by a lever-operated adjustment clamp. The two arm members are coupled to a collapsible tripod leg assembly to vary the height of the multi-positionable desktop surface. Furthermore, the multi-configurable portable desk or table companion is adapted to be used as a table tray, night stand, or other furniture for use in the home or office.

39 Claims, 12 Drawing Sheets

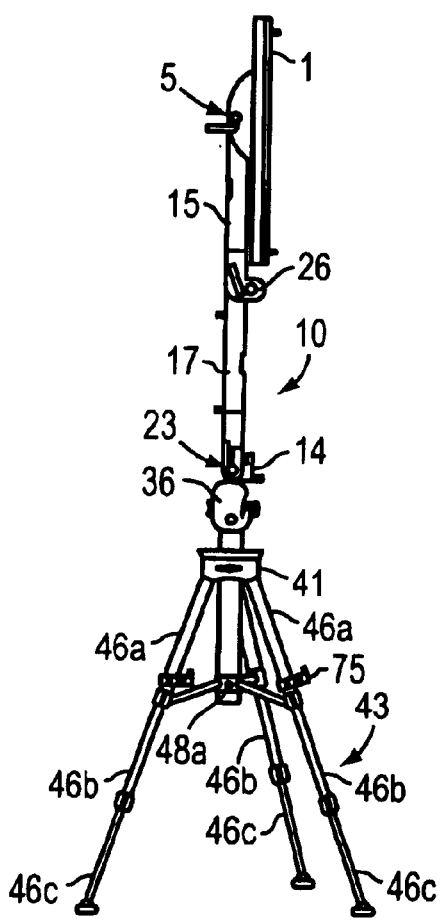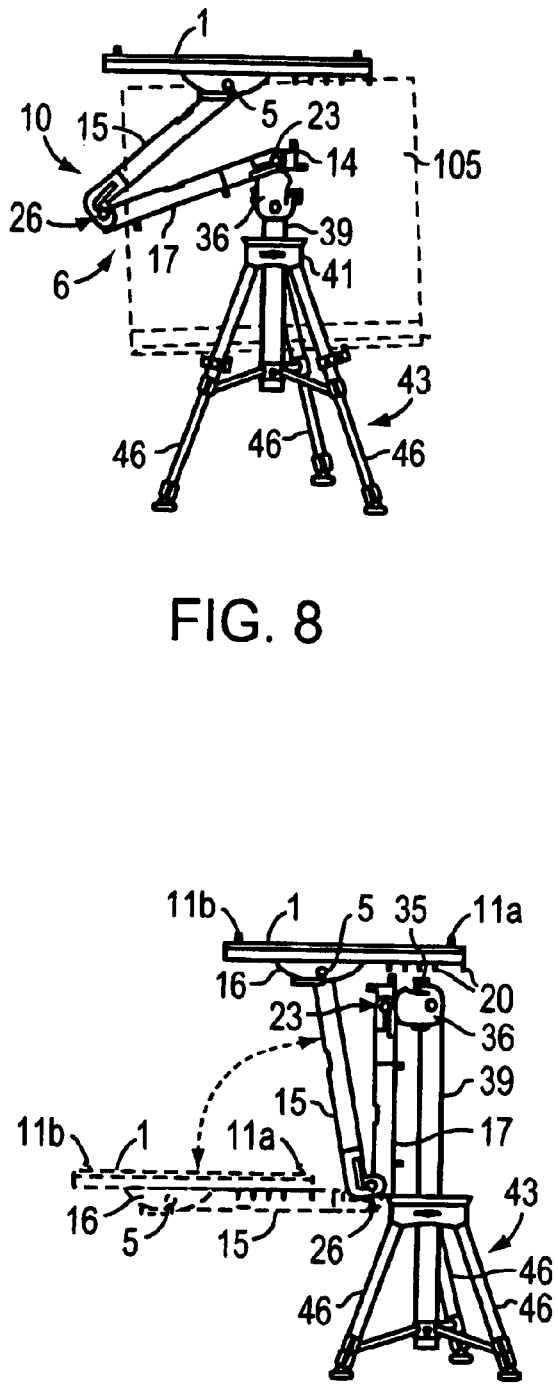
FIG. 5B
FIG. 8
FIG. 10

MULTI-CONFIGURABLE PORTABLE DESK COMPANION

CROSS-REFERENCES TO RELATED APPLICATIONS

This nonprovisional patent application claims the benefit of the U.S. Provisional Application No. 60/252,075, filed on Nov. 21, 2000.

BACKGROUND OF THE INVENTION

1. Field of the Invention

The present invention relates to portable desks and, more particularly, to a multi-configurable portable desk companion that is collapsible for portability and adjustable for multi-purpose use such as, without limitation, for use as a laptop table, desk (adult or child), easel stand, podium, artist table, draftsman table or the like.

2. General Background

Desks that are portable or adjustable, or both, are disclosed in a variety of configurations and sizes. For example, U.S. Pat. No. 893,694, issued to Allenson, discloses a portable desk which has legs that were adjustable to allow them to be adjusted to different heights.

U.S. Pat. No. 3,177,991, issued to Walker, discloses a portable desk which can be found into the a suitcase like enclosure for transportation.

U.S. Pat. No. 3,669,227, issued to Alford, discloses a portable desk which has adjustable legs and a working surface with a book rest attached.

U.S. Pat. No. 4,595,086, issued to Simpson, discloses a portable desk that has a desk top unit which is collapsible into a carrying case.

However, these portable desks are limited in the number of degrees of variability and configurations.

As will be seen more filly below, the present invention is substantially different in structure, methodology and approach from that of prior portable and adjustable desks.

SUMMARY OF THE INVENTION

Broadly, the present invention contemplates a multi-configurable portable desk companion that is collapsible for portability and adjustable for multi-purpose use such as, without limitation, for use as a laptop table, desk (adult or child), easel stand, podium, artist table, draftsman table or the like.

More specifically, the present invention contemplates a multi-configurable desk companion comprising: a multi-positionable desktop surface; a first arm member coupled to the multi-positionable desktop surface to permit a first angular rotation clockwise and, alternately, counter-clockwise of the multi-positionable desktop surface; a second arm member pivotally coupled to the first arm member to permit a second angular rotation clockwise and, alternately, counter-clockwise of the first arm member; and, a height adjusting assembly adapted to adjust the height of the multi-positionable desktop surface and which has pivotally coupled thereto the second arm member to permit a third angular rotation clockwise and, alternately, counter-clockwise of the second arm member with respect to the height adjusting assembly.

The first angular rotation is approximately 180 degrees. The second angular rotation is at least 180 degrees and preferably, substantially 360 degrees. The third angular rotation is at least 150 degrees. The height adjusting assembly further includes a pole which is adapted to be swivelled or rotated in a fourth angular rotation which is approximately 360 degrees. The fourth angular rotation is perpendicular to the first, second and third angular rotations.

The present invention further contemplates a multi-configurable table companion comprising: a multi-positionable tabletop surface; a moveable support arm having a first arm member lockably and pivotally coupled to the multi-positionable tabletop surface and a second arm member lockably and pivotally coupled to the first arm member; and, a leg assembly having the second arm member lockably and pivotally coupled to wherein the second arm member is adapted to rotate at least 300 degree about the leg assembly.

In view of the above, an object of the present invention is to provide a multi-configurable portable desk companion that is collapsible to permit it to be transported and/or carried in a carried in a carrying case.

These and other objects and advantages of the present invention will become apparent from the description, claims and the accompanying drawings.

BRIEF DESCRIPTION OF THE DRAWINGS

For a further understanding of the nature and objects of the present invention, reference should be had to the following description taken in conjunction with the accompanying drawings in which like parts are given like reference numerals and, wherein:

FIG. 5B illustrates a side view of the multi-configurable portable desk companion of the present invention for use in a swivel easel stand state;

FIG. 8 illustrates a side view of the multi-configurable portable desk companion of the present invention in a podium state and which supports a display board, shown in phantom;

FIG. 10 illustrates a side view of the multi-configurable portable desk companion of the present invention and maneuverability of the desktop surface, shown in phantom to a further alternate desk state for use while sitting on the floor or a low chair;

DESCRIPTION OF THE PREFERRED EMBODIMENT

Figure 1:
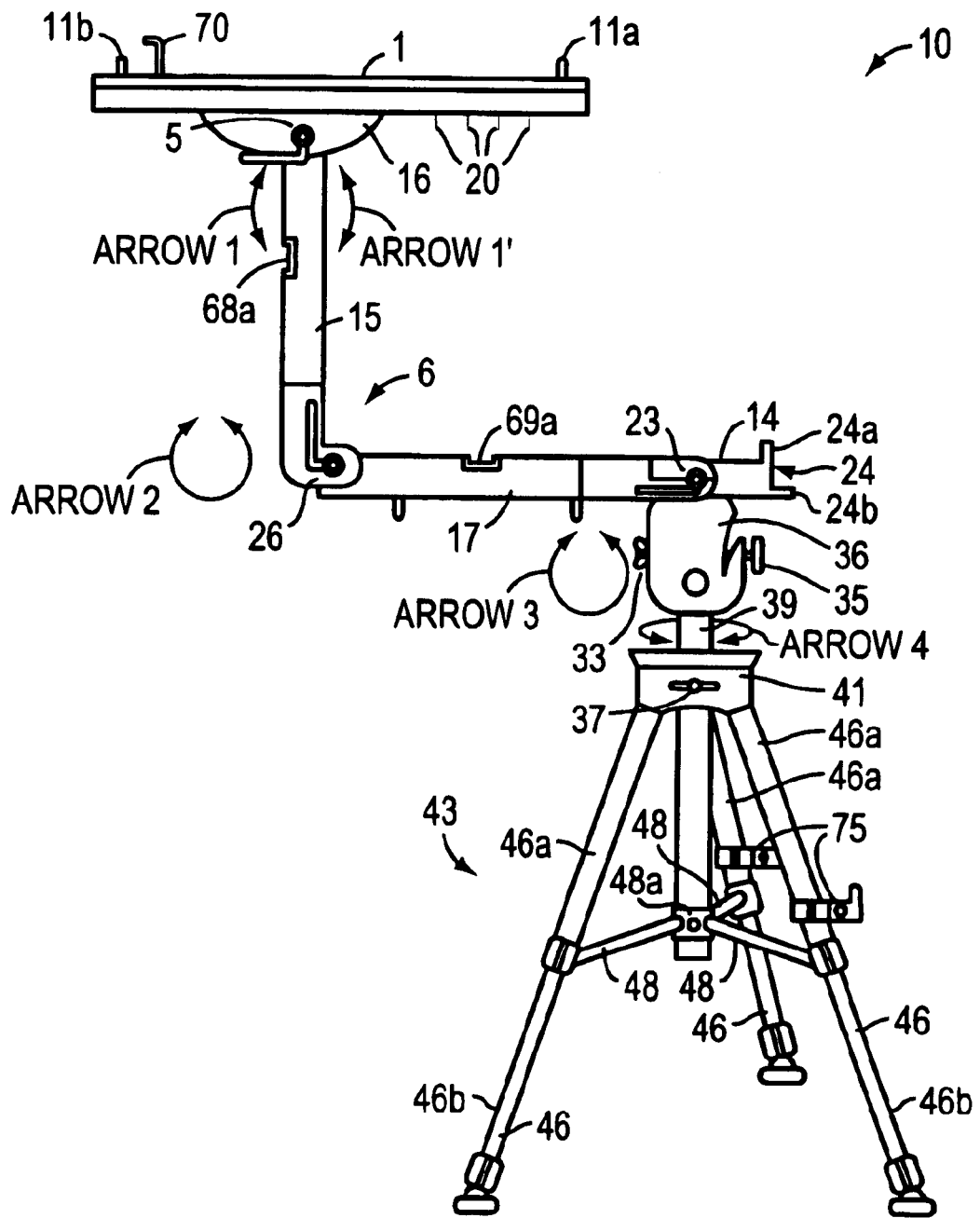
FIG. 1 illustrates a side view of the multi-configurable portable desk companion of the present invention in an erect position such as for use in a podium state.

Referring now to the drawings and in particular FIG. 1, the multi-configurable portable desk companion of the present invention is generally referenced by the numeral 10. The multi-configurable portable desk companion 10, in general, is comprised of a multi-positionable desktop surface 1 adapted to be positioned in a variety of angles by a pair of foldable and adjustable arm members 15 and 17 defining an moveable support arm 6 and which is supported by a collapsible tripod leg assembly 43. In operation, the multi-functional portable desk companion 10 can be oriented to function as a desk in a desk state, an easel or easel stand in an easel state, a music stand in a music stand state, artist or draftsmen table state, or a podium in a podium state. Furthermore, in each state, namely the desk state, the easel or easel stand state, the music stand state, artist table state and the podium state, the multi-functional portable desk companion 10 can assume a variety of configurations which varies the height and/or angle of the multi-positionable desktop surface 1, as best seen in FIGS. 5–10.

Since the multi-functional portable desk companion 10 has many degrees of variability, the multi-functional portable desk companion 10 can function as furniture, such as, without limitation, as a night stand, a table, and a tray table. The multi-functional portable desk companion 10 can be used indoors or outdoors, in recreational vehicles, or 18 wheeler trucks. Furthermore, the multi-functional portable desk companion 10 can be used as furniture in an office. As will be seen more clearly from the description below, the multi-positionable desktop surface 1 of the multi-functional portable desk companion 10 can be swivelled into use.

While some of the orientations and configuration in the various states may resemble each other, one of the primary differences would be the height. For example, in the desk state and the podium state the multi-positionable desktop surface 1 may be generally level or parallel to the horizontal plane. However, in the desk state, the multi-positionable desktop surface 1 would have a lower height so that the user can sit on a chair, bed, sofa, ledge or the like. On the other hand, in the podium state, the multi-positionable desktop surface 1 would preferably be raised to a higher height so that the user can use the multi-functional portable desk companion 10 while standing. As can be appreciated, the height of the multi-positionable desktop surface 1 in the podium state would be a user's choice for comfort and a function of the user's height.

The music stand state and the artist or draftsmen table state are provided for differentiation of angled orientations of the multi-positionable desktop surface 1. However, in a desk state or the podium state, the user may desire to orient the multi-positionable desktop surface 1 in an angled orientation for comfort, reading or the like. Nevertheless, the multi-functional portable desk companion 10 can be used as a computer table to support a laptop computer on top of the multi-positionable desktop surface 1. Since the multi-functional portable desk companion 10 is portable, the multi-functional portable desk companion 10 can be setup to support a laptop computer virtually anywhere such as in airports, etc.

Figure 3:
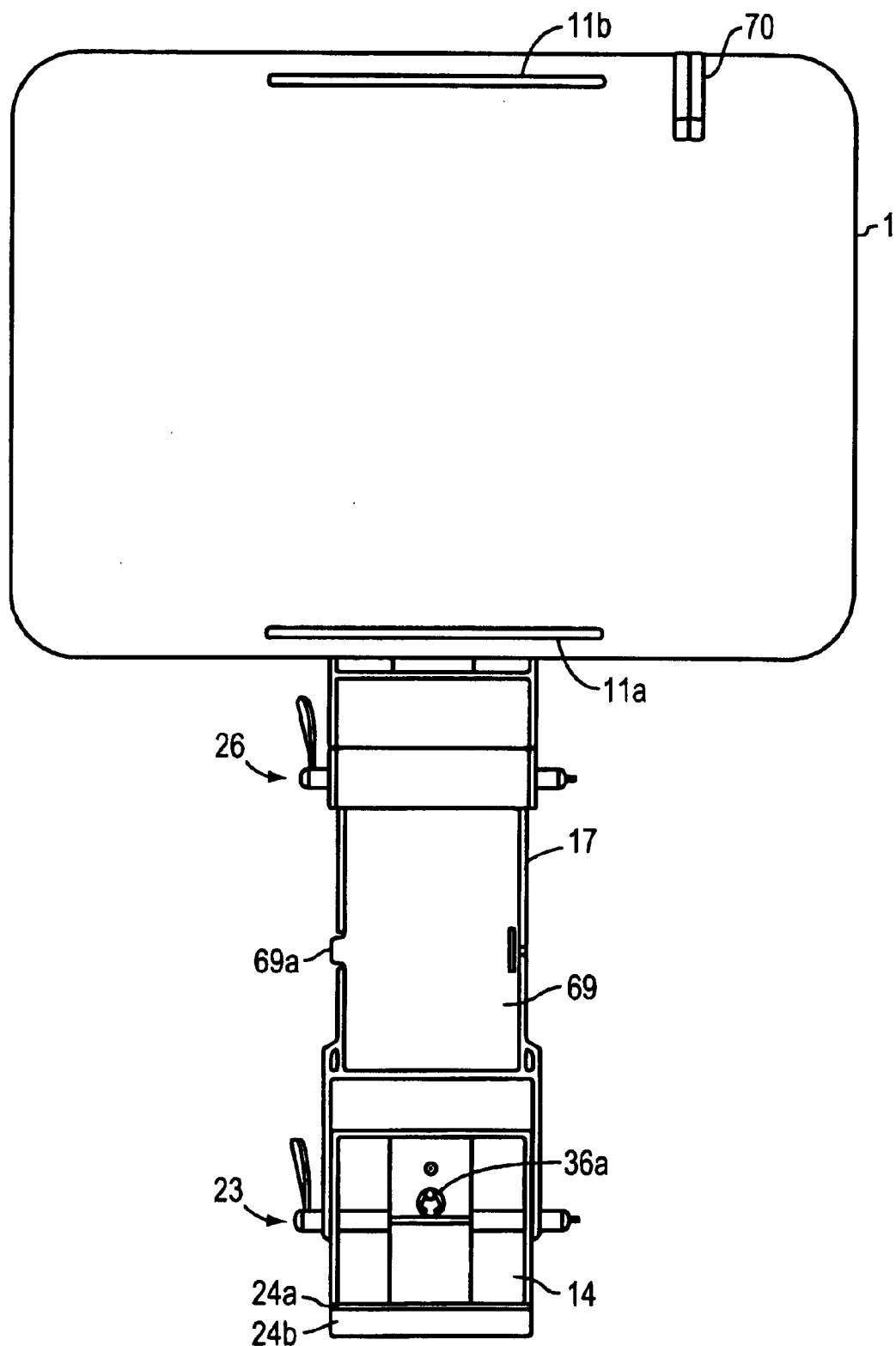
FIG. 3 illustrates a top view of the desktop surface of the multi-configurable portable desk companion when in the position of FIG. 2.
Figure 6:
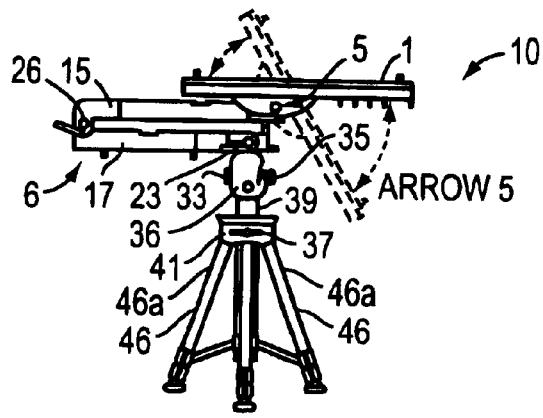
FIG. 6 illustrates a side view of the multi-configurable portable desk companion of the present invention for use in a desk state and illustrating the rotatable orientation, in phantom, of the desktop surface from the horizontal or level plane to a stand or artist table state.
Figure 7:
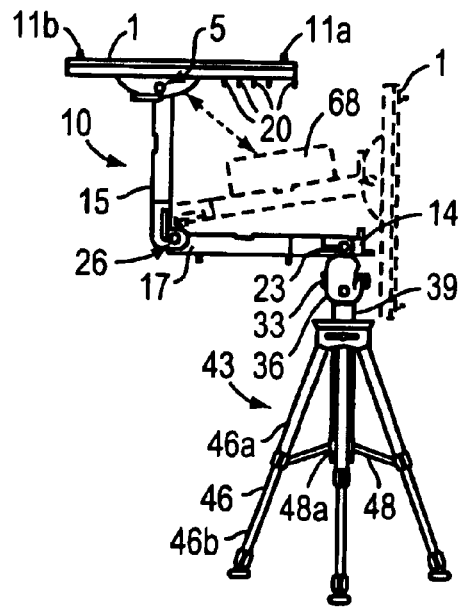
FIG. 7 illustrates a side view of the multi-configurable portable desk companion of the present invention and maneuverability of the desktop surface to a music stand state, shown in phantom.
Figure 9:
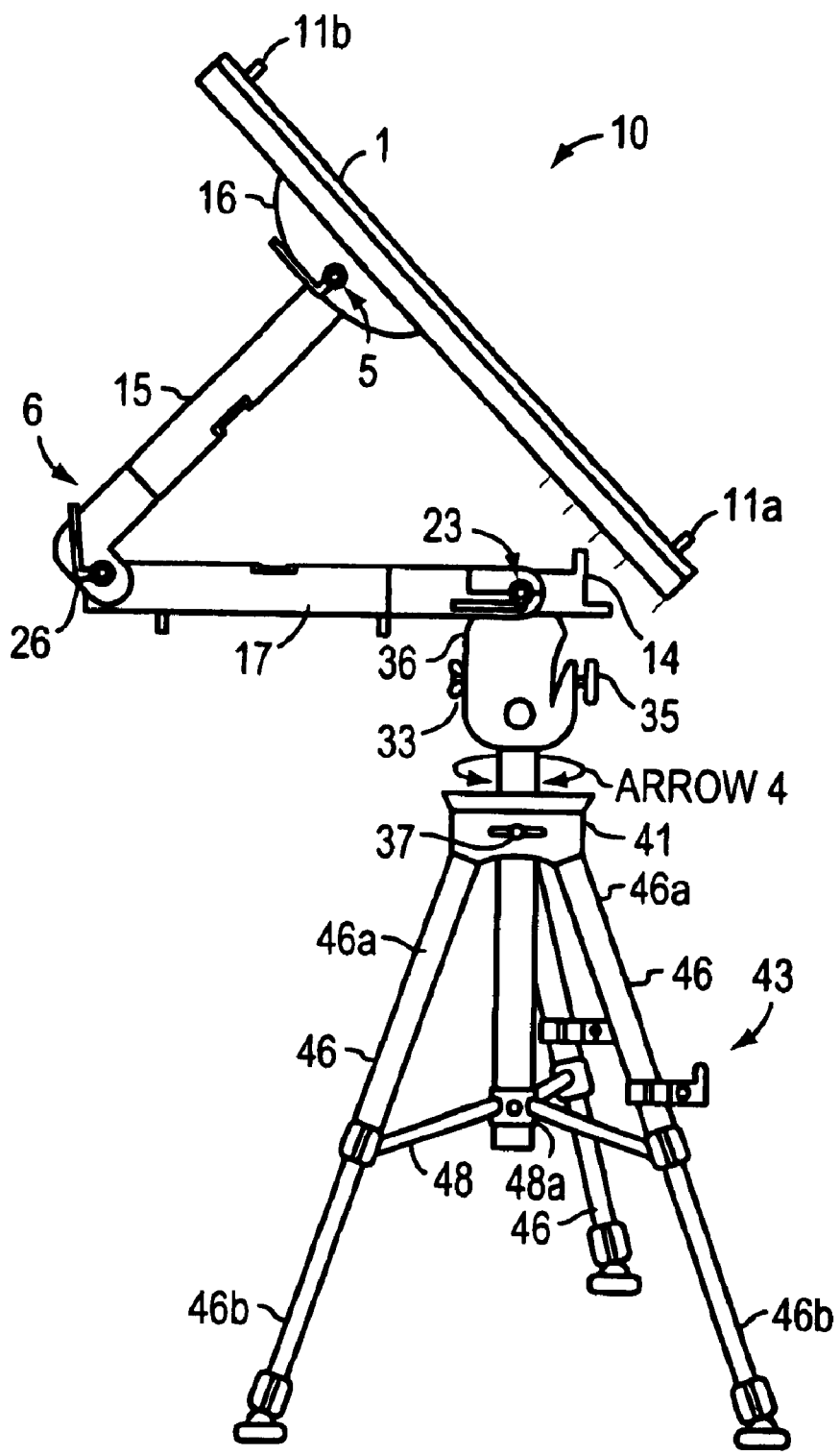
FIG. 9 illustrates a side view of the multi-configurable portable desk companion of the present invention with the desktop surface in angular orientation displaced from the horizontal plane for use in a music stand or artist table state.
Figure 11:
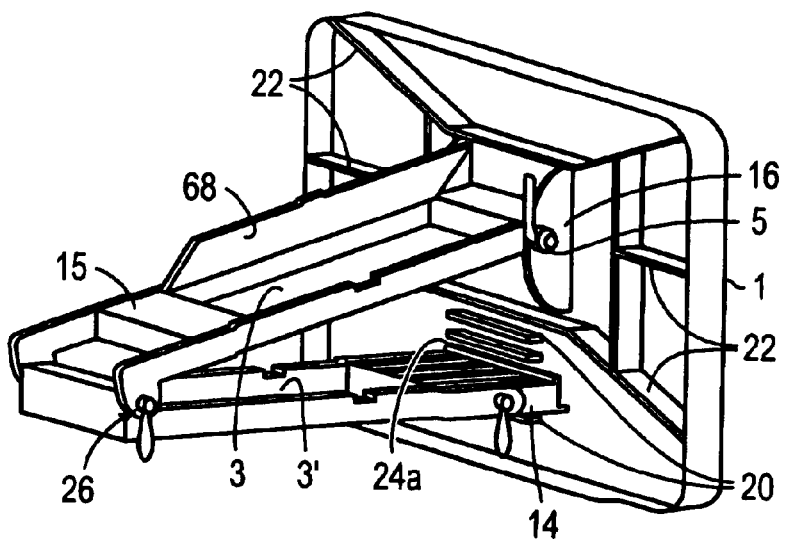
FIG. 11 illustrates a rear perspective view of the desktop surface of the multi-configurable portable desk companion of the present invention.
Figure 12:
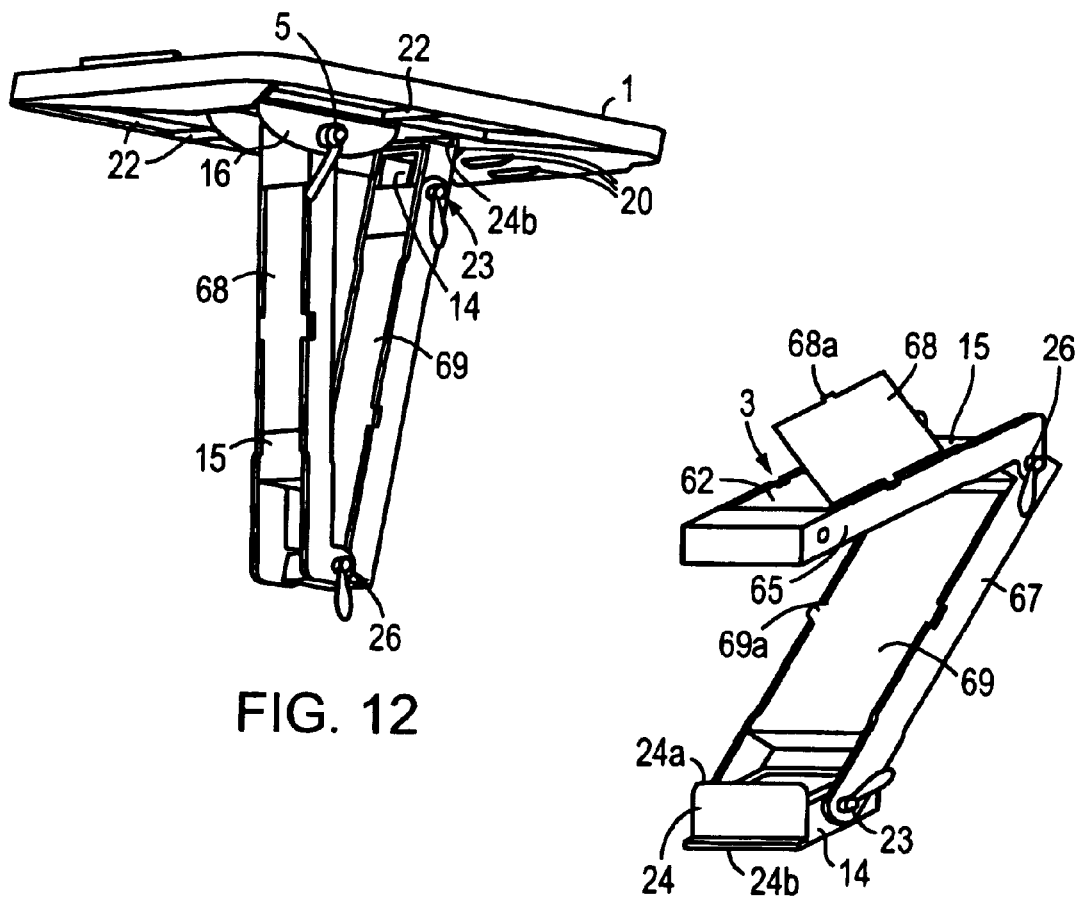
FIG. 12 illustrates a rear perspective view of the multi-configurable portable desk companion of the present invention.

Referring now to FIGS. 1 and 3, the multi-positionable desktop surface 1 has at least one book stop 11a along an edge thereof. In, preferably embodiment, there are two parallel book stops 11a and 11b which are positioned in close proximity to opposite edges of the multi-positionable desktop surface 1. By adjusting the orientation of the desktop surface 1 in a counter-clockwise rotation, using the lower lever-operated adjustable clamp 5 (which will be described in more detail below), the book stop 11b, parallel to book stop 11a, can also be used to support books, papers or a laptop. The book stops 11a and 11b extend upwardly from the multi-positionable desktop surface 1 and are permanently secured thereto. The book stops 11a and 11b can be used to prevent material from sliding off of the multi-positionable desktop surface 1 or to hold a pencil or pen. As can be appreciated, the dual book stops 11a and 11b, allows the desktop surface 1 to be used in a variety of angled orientations, as shown in FIGS. 6, 7 and 9.

Referring also to FIGS. 11, 12 and 14–15, the underside of the multi-positionable desktop surface 1 has a central bracket 16 which joins a top end of the (upper) adjustable arm member 15 by bolt with the lever-operated adjustable clamp 5 to the underside of the multi-positionable desktop surface 1. The underside of the multi-positionable desktop surface 1 further includes stabilizing ribs 22 radiating from the central bracket 16 and extending to the left and right sides of the multi-positionable desktop surface 1. Furthermore, the underside of the multi-positionable desktop surface 1 includes a plurality of spaced-apart parallel ledges 20 each of which is capable of abutting a leg 24a or 24b of an L-shaped front wall 24 on the support arm attachment 14 rotatably coupled to the (lower) arm member 17.

Figure 14:
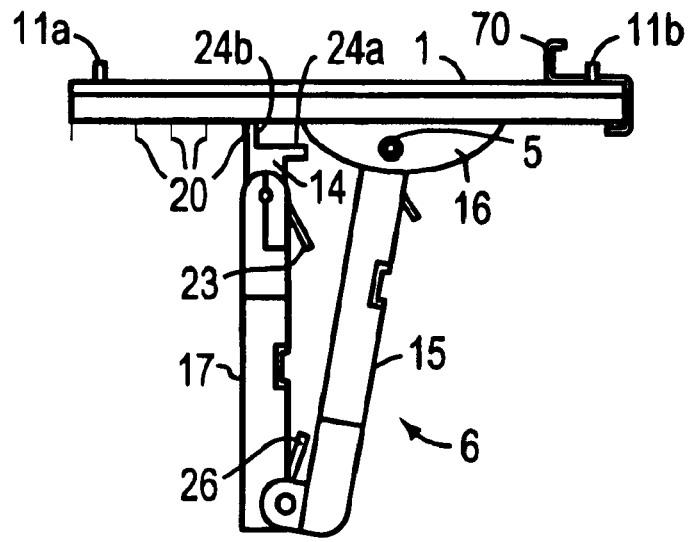
FIG. 14 illustrates a side view of the multi-configurable portable desk companion of the present invention and a ledge-to-lip connection between the desktop surface and the rotating support attachment.
Figure 15:
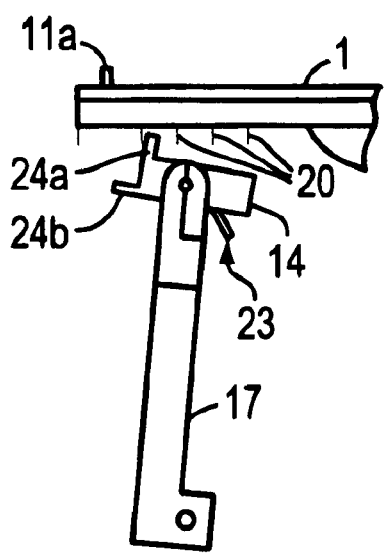
FIG. 15 illustrates a side view of the multi-configurable portable desk companion of the present invention and an alternate orientation of the ledge-to-lip connection between the desktop surface and the rotating support attachment.

As best seen in FIGS. 14 and 15, the (lower) arm member 17 can be rotated with respect to the support arm attachment 14 so that one of the legs 24a and 24b can be abutted against one of the parallel ledges 20 for added support and stability, as the multi-positionable desktop surface 1 is secured in one of its numerous orientations. However, in some orientations of the multi-positionable desktop surface 1, neither of the legs 24a and 24b would be capable of abutted against one of the parallel ledges 20 such as shown in FIGS. 8, 10, and 5B. Nevertheless, the stability of the multi-positionable desktop surface 1 is not compromised.

Figure 13:
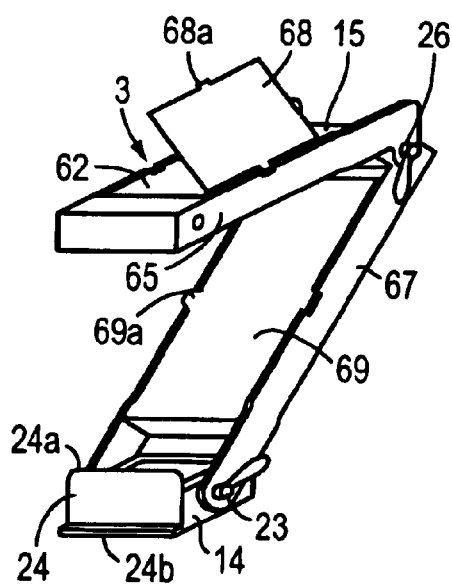
FIG. 13 illustrates the storage compartments or drawers of the multi-configurable portable desk companion of the present invention.

Referring also to FIG. 13, in the exemplary embodiment, arm members 15 and 17 are elongated structures having a perimeter wall structure 65 and 67, respectively. Storage compartments or drawers 3 and 3' are formed in the elongated structure of arm members 15, 17, respectively, wherein doors 68 and 69 are hingedly coupled to the perimeter wall structure 65 and 67, respectively, at a location over the storage compartment or drawer 3 and 3', respectively, to permit access thereto. The doors 68 and 69 include tabs 68a and 69a, respectively, for opening and closing (lifting or lowering) the doors 68 and 69. In the exemplary embodiment, storage compartments or drawers 3 and 3' are for the storage of pencils, pens, markers or the like when transporting the multi-functional portable desk companion 10.

Referring now to FIGS. 1–15, the pair of foldable, adjustable arm members 15 and 17 of the moveable support arm 6 are adapted to rotate about each other approximately 360 degrees to adjust the multi-positionable desktop surface 1 to variety of positions. A lever-operated adjustable clamp 26 joins the adjustable arm members 15 and 17 together. By adjusting the pressure supplied by the lever-operated adjustable clamp 26, the (upper) arm member 15 may be rotated and its orientation changed. The (lower) arm member 17, at its lower or free end, is pivotally joined by bolt of a lever-operated adjustable clamp 23 to the collapsible tripod leg assembly 43 via the support arm attachment 14. By adjusting the pressure supplied by the lever-operated adjustable clamp 23, the (lower) arm member 17 may be rotated and its orientation changed about the support arm attachment 14. It should be noted that by adjusting the pressure supplied by the lever-operated adjustable clamp 5, the multi-positionable desktop surface 1 may be rotated and its orientation changed. The clamping pressure is adjusted by rotating the levers of the lever-operated adjustable clamps 5, 26 and 23.

Figure 5A:
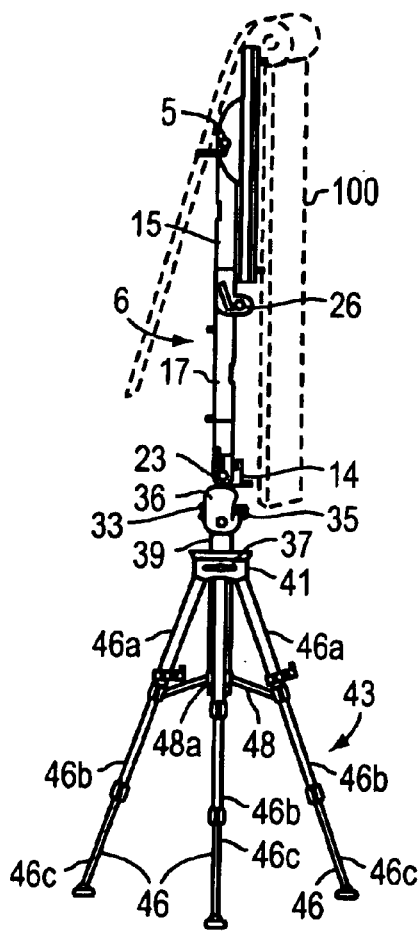
FIG. 5A illustrates a side view of the multi-configurable portable desk companion of the present invention in a fully-extended for use in an easel state and with an easel pad shown in phantom.

As can be appreciated, the moveable support arm 6 functions similar to an anatomical arm however the lever-operated adjustable clamps 5, 26 and 23, which can be equated to a wrist, an elbow and a shoulder, respectively, are limited to a single plane of rotation. For example, the lever-operated adjustable clamp 5 functions similar to a wrist but is generally limited to a single plane of rotation of approximately 180 degrees clockwise or, alternately, counter-clockwise of a first angular rotation ARROWS 1 and 1', when the multi-positionable desktop surface 1 is rotated from a vertical position (FIG. 5A or 5B). When the multi-positionable desktop surface 1 is rotated from a horizontal position, the first angular rotation ARROWS 1 and 1' is generally limited to approximately 90 degrees of rotation (FIG. 1 or 6). The lever-operated adjustable clamp 26 functions similar to an elbow but is not limited to only 180 degree rotation of an elbow. Instead, the lever-operated adjustable clamp 26 can be independently rotated in a single plane approximately 360 degrees and locked or clamped to any angle of rotation within the 360 degrees of a second angular rotation ARROW 2. Furthermore, the lever-operated adjustable clamp 23 functions similar to a shoulder but has the ability to be rotated in a single plane approximately 360 degrees in a third angular rotation ARROW 3.

In operation, when configuring the multi-configurable portable desk companion 10, the height and orientation of the multi-positionable desktop surface 1 is a function of the angular relationships of the (upper) adjustable arm member 15 to the (lower) adjustable arm member 17 and the angular relationship of the moveable support arm 6 with respect to the collapsible tripod leg assembly 43.

The (lower) arm member 17 is coupled to the collapsible tripod leg assembly 43 via a support arm attachment 14. The collapsible tripod leg assembly 43 includes a vise-like plate or housing 36 having first and second adjustable knobs 33 and 35 coupled thereto. The support arm attachment 14 is fastened to the top of the vise-like plate or housing 36 via a fastener 36a, such as a carriage bolt and nut or the like. Moreover, the vise-like plate or housing 36 is coupled to the top end of pole or shaft 39.

In operation, the vise-like housing 36 is adapted to be swivelled or rotated about the longitudinal axis of the pole or shaft 39, approximately 360 degrees, upon operation of the first adjustable knob 33. Hence, as the vise-like housing 36 is swivelled or rotated, which occurs in the horizontal plane, the affixed support arm attachment 14, coupled to the moveable support arm 6, swivels or rotates in a fourth angular rotation ARROW 4 wherein the fourth angular rotation ARROW 4 is perpendicular the rotations of the first, second and third rotations. The moveable support arm 6 is swivelled or rotated in the fourth angular rotation, as the support arm attachment 14 is swivelled or rotated during the rotation of the vise-like housing 36 about the top end of the shaft or pole 39.

In the configuration shown in FIG. 1, the (lower) arm member 17 is limited to a vertical rotation of approximately 300 degrees from a 5 O'clock orientation to a 7 O'clock orientation. The full vertical rotation of (lower) arm member 17 within the third angular rotation is limited by the collapsible tripod leg assembly 43. However, in the configuration shown in FIG. 10, the (lower) arm member 17 is capable of rotating fully within the third angular rotation of approximately 360 degrees. Thus, the (lower) arm member 17 is adapted to be rotated approximately 360 degrees both vertically (third angular rotation) and horizontally (fourth angular rotation).

Figure 2:
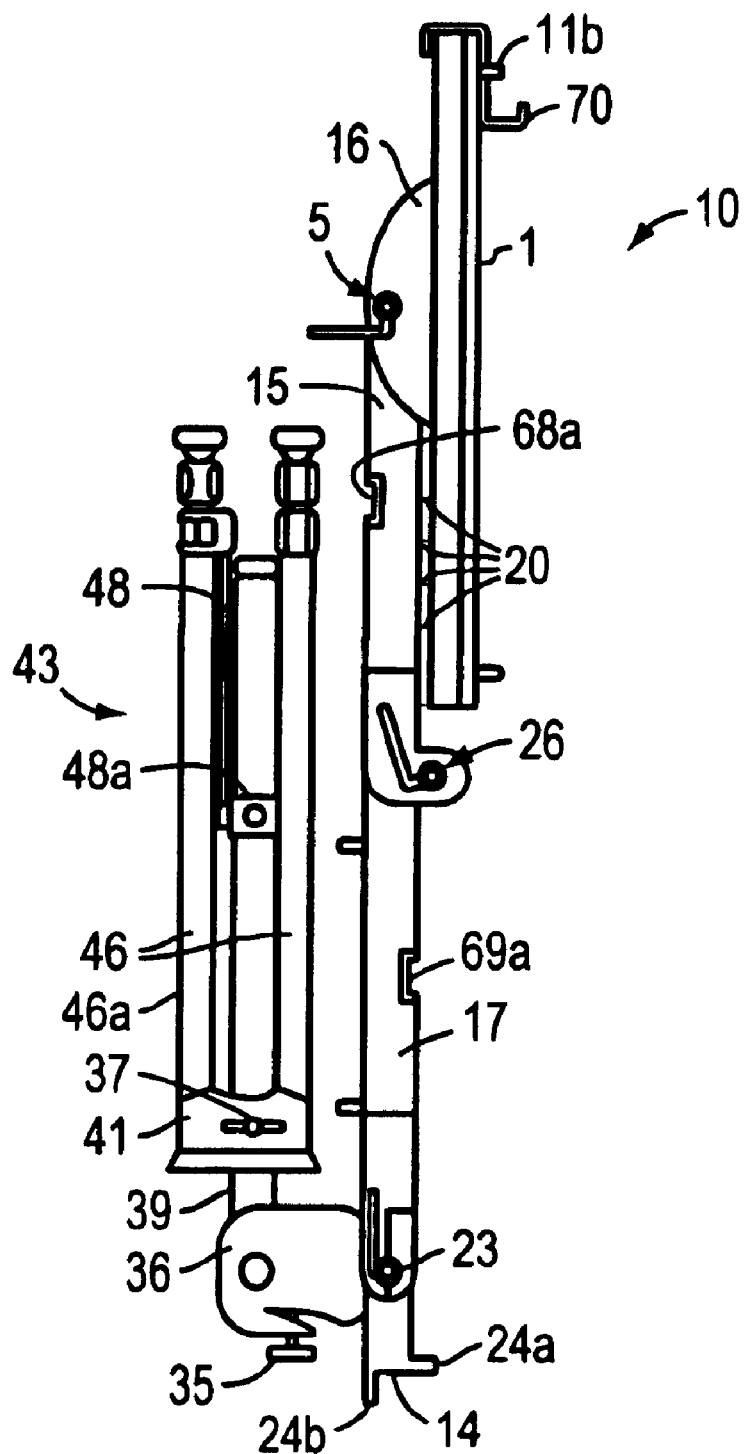
FIG. 2 illustrates a side view of the multi-configurable portable desk companion of the present invention in a folded or collapsed position for transportation.

Regarding now the second operation of the vise-like plate or housing 36, operation of the second knob 35 allows the vise-like housing 36 to be rotated left or right about the top end of the shaft or pole 39. Accordingly, as the vise-like housing 36 rotated left or right in a vertical plane, the affixed support arm attachment 14, coupled to the moveable support arm 6, rotates support arm 6. Thereby, the moveable support arm 6 can be easily aligned essentially parallel with the collapsible tripod leg assembly 43 when collapsed or to achieve further degrees of variability and configurations, as best seen in FIGS. 2 and 10.

In other words, when all of the lever-operated adjustable clamps 5, 26 and 23 are locked and a particular orientation of the multi-positionable desktop surface 1 is achieved, further positions and orientations are available by the operation of vise-like plate or housing 36.

The collapsible tripod leg assembly 43 further includes, below the second knob 35, a third adjustment knob 37 with an attached threaded shaft (NOT SHOWN). The third adjustments knob 37 is used to fix the vertical disposition of the shaft or pole 39. This is accomplished with the free end of the treaded shaft (NOT SHOWN) on the third adjustment knob 37 bearing against the contacted shaft or pole 39. The shaft or pole 39 slidably extends though an upper retaining collar 41 of the collapsible tripod leg assembly 43.

The collapsible tripod leg assembly 43 further comprises three telescopic tripod legs 46 each of which includes three telescoping hollow leg segments 46a, 46b and 46c, as best seen in FIGS. 5A and 5B. The collapsible tripod leg assembly 43 has three supporting foldable braces 48 equally spaced around and extending outwardly from the shaft or pole 39, one for each telescopic tripod leg 46. The supporting foldable braces 48 are coupled to the shaft or pole 39 via slidable pole ring 48a. As the three telescopic tripod legs 46 are collapsed, the supporting foldable braces 48 are adapted to be slidably folded or oriented substantially parallel with the shaft or pole 39 as the slidable pole ring 48a slides therealong, as best seen in FIG. 2.

By tighten the third adjustment knob 37, the shaft or pole 39 may be fixed in a vertical position relative to the supporting collapsible tripod leg assembly 43 and held in that position. The upper end of the shaft or pole 39 can be elevated above the position of the collar 41, through which the pole slides, to a height of up to about 12.5 inches. The total height the collapsible tripod leg assembly 43 may be raised in length by adjusting (telescoping) the three leg segments 46a, 46b and 46c, in a conventional manner.

Height adjustment can be achieved without telescoping or extending the three leg segments 46a, 46b and 46c. As shown in FIG. 10, shaft or pole 39 can be extended upward, via operation of the third adjustable knob 37, while the three telescopic tripod legs 46 remain shortened. As can be appreciated, the collapsible tripod leg assembly 43 functions in the manner as a tripod. However, other height adjusting assemblies can be used provided the arm member 17 and any attachment between the height adjusting assembly can effectuate the vertical (third angular rotation) and the horizontal (fourth angular rotation) rotations. For example, the height adjusting assembly is not limited to three legs but may have four legs. Alternately, the height adjusting assembly my include only a center shaft which can be swivelled and lengthened and which is supported by a bottom base. The height adjusting assembly raises the arm member 17 a distance above ground.

Referring now to FIG. 2, a side view of the present invention in a folded or collapsed position is shown. In this position the tripod legs 46 are shortened. Further, the three supporting braces 48, connecting each tripod leg 46 with the lower end of shaft or pole 39, via slidable pole ring 48a, have been collapsed. The individual lever-operated clamps 5, 26, and 23 each have been released from a clamped or holding position. This allows the two arm members 15 and 17 and the multi-positionable desktop surface 1 to be collapsed and aligned generally parallel with each other.

Figure 4:
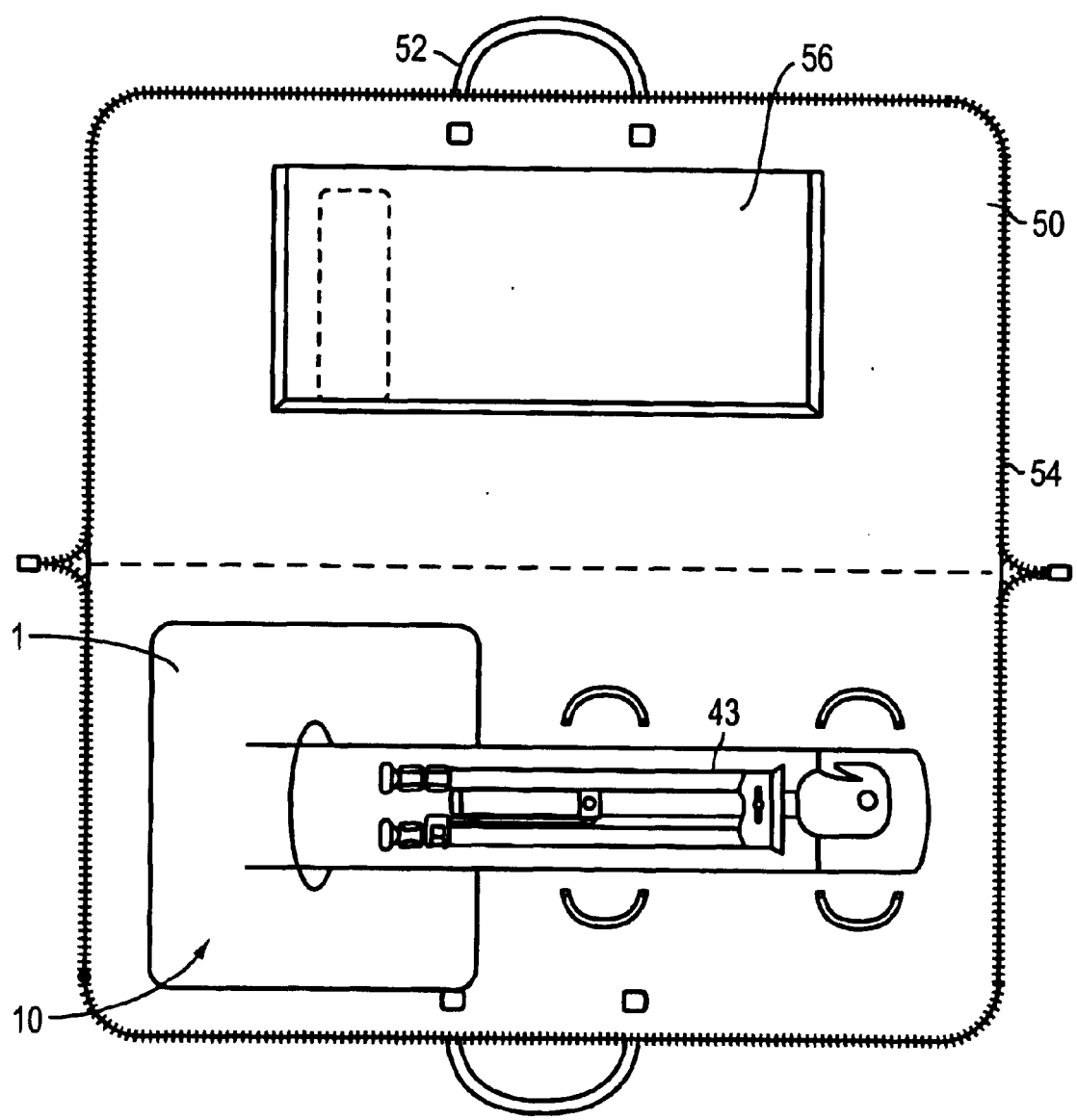
FIG. 4 illustrates an open/top view of a carrying case in accordance with the present invention with the multi-configurable portable desk companion collapsed or folded therein.

FIG. 4 is a top view showing the multi-configurable portable desk companion 10 collapsed and folded in carrying case 50. The carrying case has a handle 52 for easy carrying. The carrying case 50 can be folded along the dotted line. In the exemplary embodiment, the carrying case 50 is zipped around its outer perimeter via zipper 54 and includes an optional window 56.

When folded, as shown in FIG. 4, the multi-configurable portable desk companion 10 can easily be stored or transported in cars, trucks, and overhead airline compartments. The erected multi-configurable portable desk companion 10 may be used in the home, school, conferences, or meetings where there are no tables to write on. The multi-configurable portable desk companion 10 provides an individual with a table tray, easel pad support, lectern and a desktop for reading and note taking all in one. It also helps to encourage proper body posture so one can sit comfortably for lone period of time.

Referring now to FIGS. 5A and 5B, the multi-configurable portable desk companion 10 is oriented in an easel or easel stand state. In the easel or easel stand state, removable S-hooks 70 (only one shown in FIG. 3) can be used to support and suspend an easel pad 100, shown in phantom, from an elevated edge of the multi-positionable desktop surface 1. In the easel or easel stand state, the arm members 15 and 17 are both oriented vertically. Likewise, and the multi-positionable desktop surface 1 is oriented vertically. The lever-operated adjustable clamps 5, 26 and 23 maintain the arm members 15 and 17 and the multi-positionable desktop surface 1 in their illustrated orientations. Furthermore with respect to FIG. 5A, the collapsible tripod leg assembly 43 is fully extended to maximize the height. In other words, the three telescoping hollow leg segments 46a, 46b and 46c are fully telescoped to achieve the maximum length thereof.

It should be noted that a very, very tall person may require the maximum height when using the multi-configurable portable desk companion 10 as a podium.

Nevertheless, in the easel or easel stand state, the collapsible tripod leg assembly 43 does not have to have the three telescoping hollow leg segments 46a, 46b and 46c fully telescoped. Instead, the three telescoping hollow leg segments 46a, 46b and 46c can be shortened, as desired. In FIG. 5B, the shaft or pole 39 can be swivelled in the fourth angle rotation to allow the easel or easel stand to be rotated on demand to permit viewing by an audience.

Referring now to FIG. 6, the multi-configurable portable desk companion 10 is oriented in one of many possible desk states. In the illustrated desk state, the arm members 15 and 17 are both oriented in parallel relation such that there is essentially a 0 degree angle therebetween and which both are parallel to ground or a horizontal plane. In the exemplary embodiment, the desk state also orients, the multi-positionable desktop surface 1 parallel to the horizontal plane or ground. Thereby, there is essentially a 0 degree angle between the multi-positionable desktop surface 1 and the arm members 15 and 17. The lever-operated adjustable clamps 5, 26 and 23 maintain the arm members 15 and 17 and the multi-positionable desktop surface 1 in their illustrated orientations. Furthermore with respect to FIG. 6, the multi-positionable desktop surface 1 is capable of being clockwise rotated in the direction of ARROW 5 to an angular orientation, shown in phantom. Nevertheless, the multi-positionable desktop surface 1 can be easily rotated counter-clockwise back to the horizontal position or plane. The multi-positionable desktop surface 1 is limited in its counter-clockwise rotation because of the support provided by the horizontal position of arm members 15 and 17.

The collapsible tripod leg assembly 43 is fully collapsed such that the three telescoping hollow leg segments 46a, 46b and 46c are fully collapsed to achieve the minimum length thereof. As can be appreciated, in the phantom orientation shown in FIG. 6, an adult or child sitting on the floor or ground could use the multi-positionable desktop surface 1 to write, draw or read.

Referring now to FIG. 7, the multi-configurable portable desk companion 10 is oriented in a second one of many possible desk states. In this desk state, the arm members 15 and 17 are oriented 90 degrees from the other with arm member 17 parallel to ground or the horizontal plane. This desk state also orients the multi-positionable desktop surface 1 parallel to the horizontal plane or ground. The lever-operated adjustable clamps 5, 26 and 23 maintain the arm members 15 and 17 and the multi-positionable desktop surface 1 in their illustrated orientations.

Furthermore with respect to FIG. 7, the multi-positionable desktop surface 1 is capable of being clockwise rotated in the direction of ARROW 6 to an angular orientation, shown in phantom, which is essentially vertical. Nevertheless, the multi-positionable desktop surface 1 can be easily rotated counter-clockwise back to the horizontal position or plane. The collapsible tripod leg assembly 43 is partially telescoped. The phantom orientation shown in FIG. 7 illustrates the clockwise rotation of arm member 15 by loosening the clamping force provided the lever-operated adjustable clamp 26. As long as the other clamping forces are not loosened, the orientation of multi-positionable desktop surface 1 remains essentially perpendicular to the arm member 15 and arm member 17 remains essentially parallel with the horizontal plane or ground. Also shown in phantom, the door 68 is shown opened for access into the compartment or drawer 3. In the phantom orientation shown, the leg 24b of the support arm attachment 14 abuts one of the parallel ledges 20. The phantom view is one version of a music stand.

Referring now to FIG. 8, the multi-configurable portable desk companion 10 is oriented in a podium state. In the illustrated podium state, the arm members 15 and 17 are angularly oriented while the multi-positionable desktop surface 1 remains essentially horizontal. More specifically, this view illustrates both arm members 15 and 17 are angularly offset from the horizontal plane or ground. The angular adjustment of arm member 17 is effectuated by loosening the clamping force by the lever-operated adjustable clamp 23 and rotating the arm member 17 counter-clockwise. Nevertheless, arm member 17 can be rotated to many positions in the clockwise or counter-clockwise directions. The angular adjustment of arm member 15 is effectuated by loosening the clamping force by the lever-operated adjustable clamp 26 and rotating the arm member 15 clockwise. The UL brackets 75 are coupled to at least two legs 46 to support a chalk board 105, shown in phantom, or other planar displays.

Referring now to FIG. 9, the multi-positionable desktop surface 1 is shown in one of many angular orientations to further modify the configuration of the multi-configurable portable desk companion 10. For example, in the embodiment of FIG. 9 may be used as a drafting table or for drawing. In the exemplary embodiment, the multi-positionable desktop surface 1 preferably is generally made of clear material or plastic so that light can shine therethrough. Thereby, when tracing from one paper to another, the illumination through the rear of the multi-positionable desktop surface 1 enhances to appearance of the lines on the underlining paper to be traced. Furthermore, as an artist table, the UL brackets 75, coupled to at least two legs 46, could be used to support a painting or other art work.

Referring now to FIG. 10, the multi-positionable desktop surface 1 is shown in phantom to illustrate counter-clockwise rotation thereof to further modify the configuration of the multi-configurable portable desk companion 10. As described previously, FIG. 10 illustrates an means to rotate the moveable support arm 6. As illustrated, rotating the vise housing 36 rotates support arm attachment 14 so that the lower arm member 17 can be rotated other than via the lever-operated clamp 23.

Figure 16A:
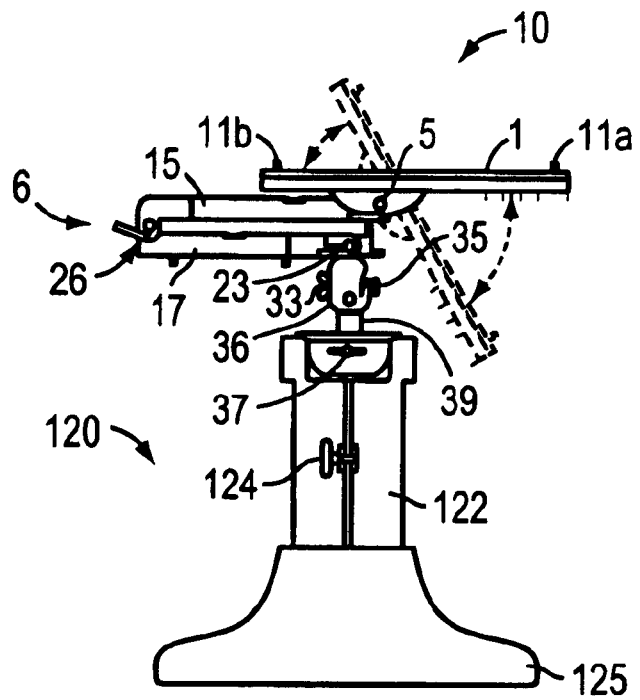
FIG. 16A illustrates a storage base for placement of the collapsible tripod leg assembly of the multi-configurable portable desk companion of the present invention.

Referring now to FIG. 16A, a storage base 120 for placement of the collapsible tripod leg assembly 43 of the multi-configurable portable desk companion 10 is illustrated. The storage base 120 is an accessory for use in a recreation vehicle or in a home, office or the like. The storage base 120 allows the collapsible tripod leg assembly 43 to be collapsed and stored in the storage base 120. However, the use and multi-configurable features of the multi-configurable portable desk companion 10 are not limited.

Figure 16B:
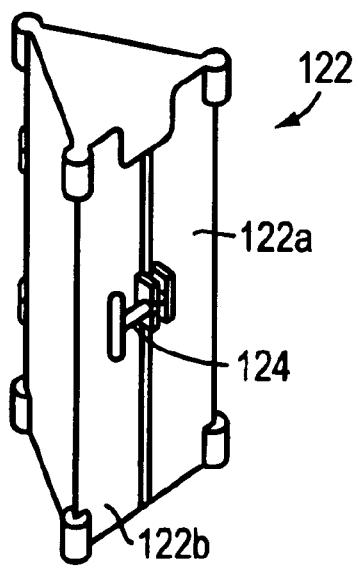
FIG. 16B illustrates a storage jacket of the storage base of the embodiment of FIG. 16A of the present invention.

The storage base 120 includes a storage jacket 122, as best seen in FIG. 16B, which is triangularly shaped with two hinged doors 122a and 122b which can be closed around the tripod legs 46 and secured via knob 124. The storage jacket is received in base mount 125 supported by the floor or ground.

Figure 17A:
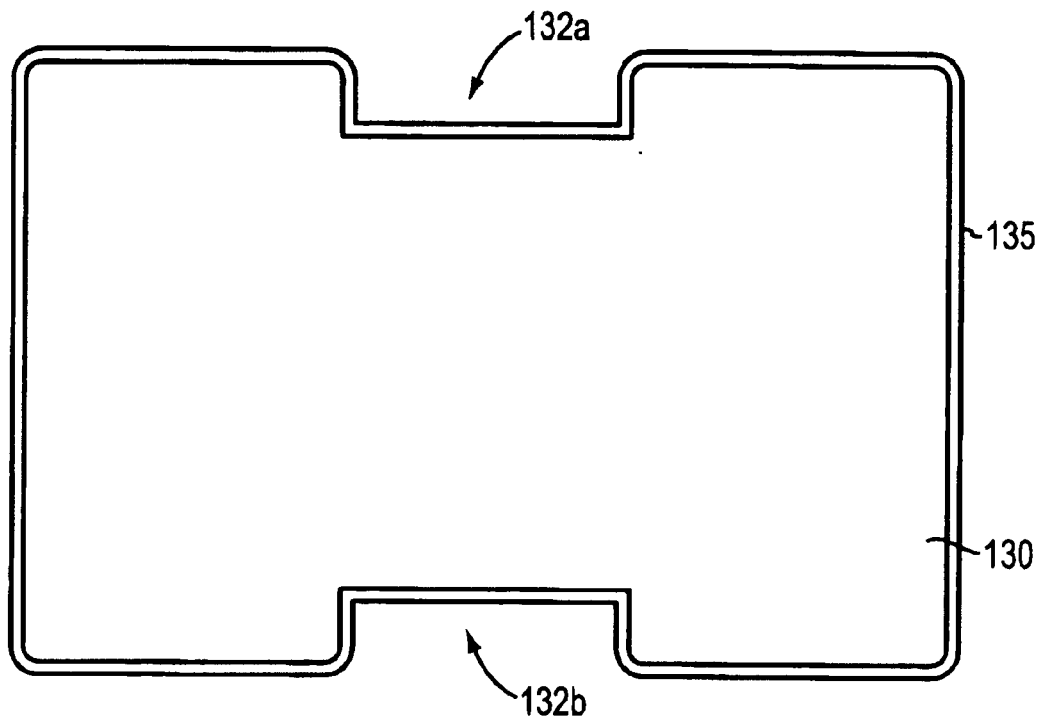
FIG. 17A illustrates a top view of an attachable cutting board for use with the multi-configurable portable desk companion of the present invention.

Referring now to FIG. 17A, a top view of an attachable cutting board 130 for use with the multi-configurable portable desk companion 10 is illustrated. The attachable cutting board 130 is generally rectangularly shaped and is adapted to be coupled to the top of the multi-positionable desktop surface 1. In the exemplary embodiment, the attachable cutting board 130 has two recesses 132a and 132b designed to be aligned with the book stops 11a and 11b. Placing the book stops 11a and 11b within recesses 132a and 132b, respectively, prevents the attachable cutting board 130 from sliding side to side or back and front.

Figure 17B:
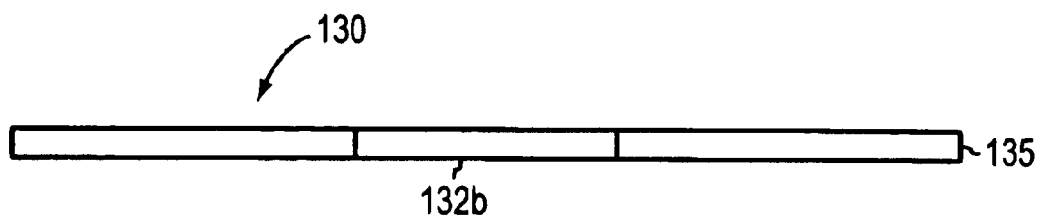
FIG. 17B illustrates a side view of the attachable cutting board of the embodiment of FIG. 17A; and, FIG. 18 illustrates a side view of the multi-configurable portable desk companion of the present invention with an attachable light fixture.

Referring now to FIG. 17B, a side view of the attachable cutting board 130 illustrating the outer perimeter lip 135 to prevent liquid spills is shown.

Figure 18:
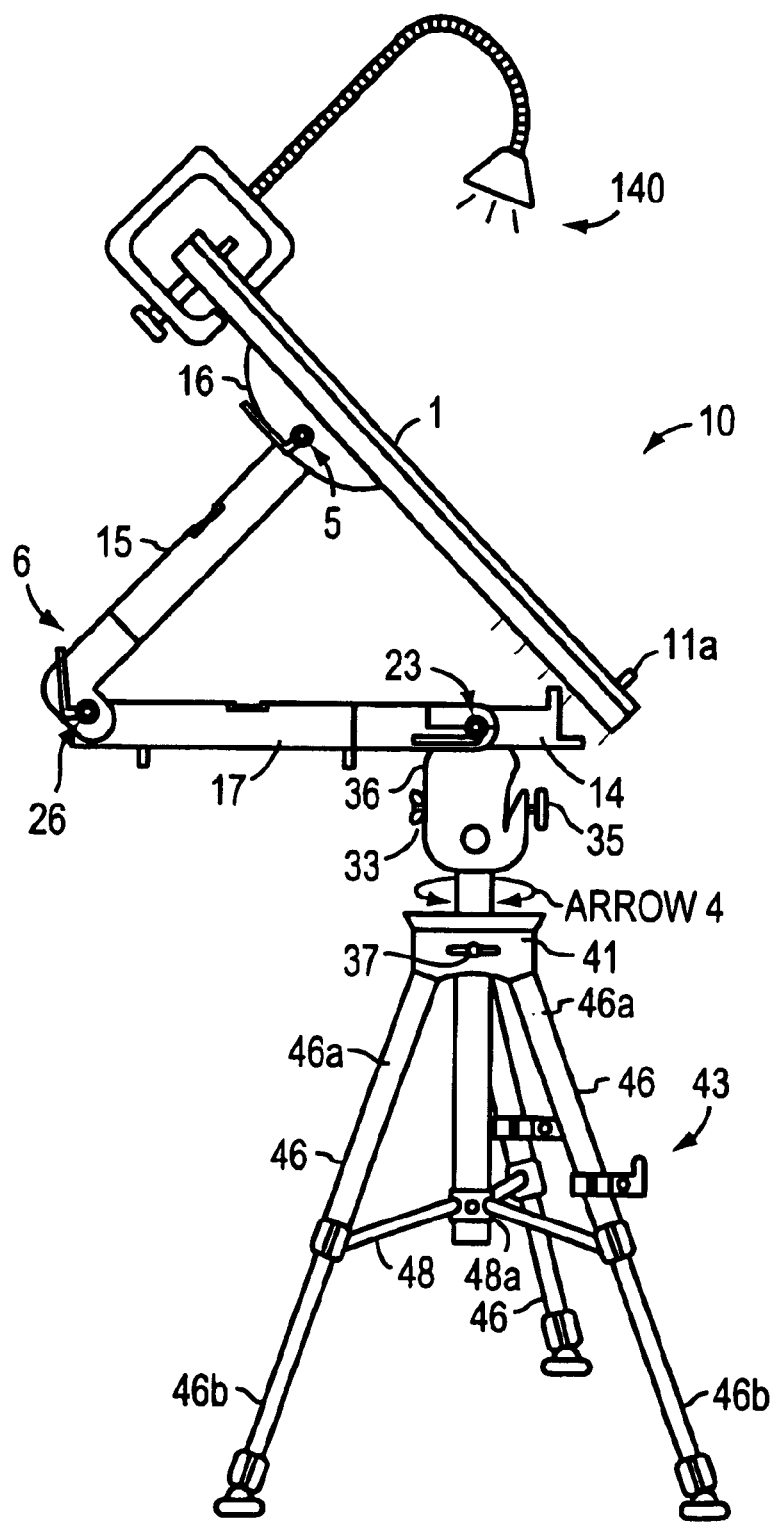

Referring now to FIG. 18, a side view of the multi-configurable portable desk companion 10 of the present invention with an attachable light fixture 140 is shown. The light fixture 140 can be clamped to the multi-positionable desktop surface 1. Alternately, the light fixture 140 can be removably coupled in a other ways such as via a suction cup coupling or the like.

Although the preferred embodiment of the present invention and the method of using the same has been described in the forgoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A multi-configurable desk companion comprising:
    a multi-positionable desktop surface;
    a first arm member coupled to the multi-positionable desktop surface to permit a first angular rotation clockwise and, alternately, counter-clockwise of the multi-positionable desktop surface;
    a second arm member pivotally coupled to the first arm member to permit a second angular rotation clockwise and, alternately, counter-clockwise of the first arm member; and,
    a height adjusting assembly adapted to adjust the height of the multi-positionable desktop surface and which has pivotally coupled thereto the second arm member to permit a third angular rotation clockwise and, alternately, counter-clockwise of the second arm member with respect to the height adjusting assembly wherein the height adjusting assembly is adapted to permit a fourth angular rotation clockwise and, alternately, counter-clockwise of the second arm member in a plane perpendicular to a plane of rotation of the first, second and third angular rotations.

2. The desk companion as claimed in claim 1, wherein:
    the first angular rotation is approximately 180 degrees;
    the second angular rotation is at least 180 degrees; and,
    the third angular rotation is at least 300 degrees.

3. The desk companion as claimed in claim 1, wherein:
    the first angular rotation is approximately 180 degrees;
    the second angular rotation is at least 180 degrees;
    the third angular rotation is at least 150 degrees; and,
    the fourth angular rotation is approximately 360 degrees.

4. The desk companion as claimed in claim 1, wherein each of the first and second arm members comprises:
    an elongated structure with a perimeter wall structure;
    a storage compartment formed in the elongated structure; and,
    a door hingedly coupled to the perimeter wall structure to at a location over the storage compartment to permit access to the storage compartment.

5. The desk companion as claimed in claim 1, further comprising:
    a first lever-operated adjustment clamp which couples the multi-positionable desktop surface to the first arm member and which controls and locks the rotation of the multi-positionable desktop surface within the first angular rotation;
    a second lever-operated adjustment clamp which couples the first arm member and the second arm member together and which controls and locks the rotation of the first arm member within the second angular rotation; and,
    a third lever-operated adjustment clamp which couples the second arm member to the height adjusting assembly and which controls and locks the rotation of the second arm member within the third angular rotation.

6. The desk companion as claimed in claim 5, wherein the first, second and third lever-operated clamps are independently adjustable.

7. The desk companion as claimed in claim 6, wherein the multi-positionable desktop surface comprises:
   a top surface having a first stop in close proximity to a first edge and a second stop parallel to the first stop in close proximity to a second edge wherein the first and second edges are parallel to the axis of rotation of the multi-positionable desktop surface; and,
   a bottom surface having a plurality of parallel ledges parallel to the axis of rotation of the multi-positionable desktop surface.

8. The desk companion as claimed in claim 1, further comprising:
   a support arm attachment coupled to the second arm member and the height adjusting assembly and having a forward L-shaped wall adapted to engage and underside of said multi-positionable desktop surface;
   wherein the heigh adjusting assembly includes:
      a plurality of collapsible legs; and,
      a extendable pole adapted to be vertically elevated;
      a housing coupled to a top of the extendable pole and to the support arm attachment wherein the housing is adapted to rotate in a fourth angular rotation clockwise and, alternately, counter-clockwise, the fourth angular rotation is in a plane perpendicular to a plane of rotation of the first, second and third angular rotations.

9. The desk companion as claimed in claim 1, wherein the height adjusting assembly includes:
   a leg assembly includes three telescopic legs for adjusting the length of the three telescopic legs.

10. The desk companion as claimed in claim 1, wherein the height adjusting assembly, the first arm member, the second arm member and the multi-positionable desktop surface are adapted to be collapsed together to a collapsed state.

11. The desk companion as claimed in claim 1, wherein the desk companion is collapsible and portable; and
   further comprising:
      a carrying case for transporting the desk companion when collapsed.

12. The desk companion as claimed in claim 1, wherein the desk companion has a first configuration for use as a desk, a second configuration for use as a podium, a third configuration for use as an easel stand to support an easel pad, a fourth configuration for use as a music stand.

13. The desk companion as claimed in claim 1, further comprising at least one S-hook adapted to be secured to the multi-positionable desktop surface to support and suspend an easel pad.

14. The desk companion as claimed in claim 1, wherein the height adjusting assembly comprises telescopic legs; and
   further comprising means, adapted to be coupled to the telescopic legs, for supporting a display board or chalk board.

15. The desk companion as claimed in claim 1, wherein the height adjusting assembly comprises is a conventional collapsible tripod assembly.

16. The desk companion as claimed in claim 1, wherein the multi-positionable desktop surface is made of generally clear material or clear plastic.

17. The desk companion as claimed in claim 1, further comprising:
   a light removably coupled to the multi-positionable desktop surface.

18. The desk companion as claimed in claim 1, further comprising:
   a cutting board removably coupled to the multi-positionable desktop surface.

19. The desk companion as claimed in claim 1, wherein said height adjusting assembly is collapsible and includes a plurality of collapsible legs; and
   further comprising:
      a storage base for placement of the collapsible height adjusting assembly when the collapsible legs are in a collapsed state.

20. The desk companion as claimed in claim 19, wherein the storage base includes:
   a storage jacket having two hinged doors which can be closed around the plurality of collapsible legs in the collapsed state; and
   a base mount supported by the floor or ground coupled to the storage jacket.

21. A multi-configurable table companion comprising:
   a multi-positionable tabletop surface;
   a height adjusting assembly having a plurality of selectable height lengths; and,
   a moveable support arm having an upper arm member, a lower arm member and first, second and third lockable rotating joints, the first and second lockable rotating joints connect and angularly orientate the multi-positionable tabletop surface, the upper arm member, and a lower arm member with respect to each other and wherein the third lockable rotating joint is pivotally coupled between the height adjusting assembly and the lower arm member
   wherein the first, second and third lockable rotating joints have first, second and third annular rotations clockwise and, alternately, counter-clockwise in a vertical plane; and
   wherein
      the first angular rotation is approximately 180 degrees;
      the second angular rotation is at least 180 degrees; and,
      the third angular rotation is at least 300 degrees.

22. The table companion as claimed in claim 21, wherein the height adjusting assembly is adapted to permit a fourth angular rotation clockwise and, alternately, counter-clockwise of the lower arm member in a horizontal plane perpendicular to the vertical plane of rotation of the first, second and third angular rotations.

23. The table companion as claimed in claim 22, wherein:
   the fourth angular rotation is approximately 360 degrees.

24. The table companion as claimed in claim 21, wherein:
   the first lockable rotating joint is a lever-operated adjustment clamp which couples the multi-positionable tabletop surface to the upper arm member and which controls and locks the rotation of the multi-positionable tabletop surface within the first angular rotation;
   the second lockable rotating joint is a second lever-operated adjustment clamp which couples the upper arm member and the lower arm member together and which controls and locks the rotation of the upper arm member within the second angular rotation; and,
   the third lockable rotating joint is a third lever-operated adjustment clamp which couples the lower arm member to the height adjusting assembly and which controls and locks the rotation of the lower arm member within the third angular rotation.

25. The table companion as claimed in claim 24, wherein the first, second and third lever-operated clamps are independently adjustable.

26. The table companion as claimed in claim 25, wherein the multi-positionable tabletop surface comprises:
   a top surface having a first stop in close proximity to a first edge and a second stop parallel to the first stop in close proximity to a second edge wherein the first and second edges are parallel to the axis of rotation of the multi-positionable tabletop surface; and,
   a bottom surface having a plurality of parallel ledges parallel to the axis of rotation of the multi-positionable tabletop surface.

27. The table companion as claimed in claim 21, wherein each of the upper and lower arm members comprises:
   an elongated structure with a perimeter wall structure;
   a storage compartment formed in the elongated structure; and,
   a door hingedly coupled to the perimeter wall structure to at a location over the storage compartment to permit access to the storage compartment.

28. The table companion as claimed in claim 21, further comprising:
   a support arm attachment coupled to the lower arm member and the height adjusting assembly and having a forward L-shaped wall adapted to engage and underside of said multi-positionable tabletop surface;
   wherein the height adjusting assembly includes:
      a plurality of collapsible legs; and,
      a extendable pole adapted to be vertically elevated;
      a housing coupled to a top of the extendable pole and to the support arm attachment wherein the housing is adapted to rotate in a fourth angular rotation clockwise and, alternately, counter-clockwise, the fourth angular rotation is in a plane perpendicular to a plane of rotation of the first, second and third angular rotations.

29. The table companion as claimed in claim 21, wherein the height adjusting assembly includes:
   a leg assembly having three telescopic legs for adjusting the length of the three telescopic legs.

30. The table companion as claimed in claim 21, wherein the height adjusting assembly, the upper arm member, the lower arm member and the multi-positionable tabletop surface are adapted to be collapsed together to a collapsed state.

31. The table companion as claimed in claim 21, wherein the table companion is collapsible and portable; and
   further comprising:
      a carrying case for transporting the table companion when collapsed.

32. The table companion as claimed in claim 21, wherein the table companion has a first configuration for use as a desk, a second configuration for use as a podium, a third configuration for use as an easel stand to support an easel pad, a fourth configuration for use as a music stand.

33. The table companion as claimed in claim 21, comprising at least one S-hook adapted to be secured to the multi-positionable tabletop surface to support and suspend an easel pad.

34. The table companion as claimed in claim 21, wherein the height adjusting assembly comprises legs; and
   further comprising means, adapted to be coupled to the legs, for supporting a display board, picture or chalk board.

35. The table companion as claimed in claim 21, wherein the height adjusting assembly comprises is a conventional collapsible tripod assembly.

36. The table companion as claimed in claim 21, wherein the multi-positionable tabletop surface is made of generally clear material or clear plastic.

37. The table companion as claimed in claim 21, further comprising:
   a cutting board removably coupled to the multi-positionable tabletop surface.

38. The table companion as claimed in claim 21, wherein said height adjusting assembly is collapsible and includes a plurality of collapsible legs; and
   further comprising:
      a storage base for placement of the collapsible height adjusting assembly when the collapsible legs are in a collapsed state.

39. A multi-configurable table companion comprising:
   a multi-positionable tabletop surface;
   a moveable support arm having a first arm member lockably and pivotally coupled to the multi-positionable tabletop surface and a second arm member lockably and pivotally coupled to the first arm member; and,
   a leg assembly having the second arm member lockably and pivotally coupled thereto wherein the second arm member is adapted to rotate at least 300 degree about the leg assembly:
   wherein each of the first and second arm members comprises:
      an elongated structure with a perimeter wall structure;
      a storage compartment formed in the elongated structure; and,
      a door hingedly coupled to the perimeter wall structure to at a location over the storage compartment to permit access to the storage compartment.

* * * * *